March 10, 1959  K. SCHWARZWÄLDER ET AL  2,877,135
TILE COMPOSITION AND PRODUCT SUITABLE FOR FLOORS OF STABLES
Filed May 12, 1955

INVENTORS
KARL SCHWARZWÄLDER
ARTUR WAGNER

ATTORNEYS

United States Patent Office 2,877,135
Patented Mar. 10, 1959

2,877,135

TILE COMPOSITION AND PRODUCT SUITABLE FOR FLOORS OF STABLES

Karl Schwarzwälder and Artur Wagner, Radolfzell, Baden, Germany

Application May 12, 1955, Serial No. 507,951
In Germany December 31, 1948

Public Law 619, August 23, 1954
Patent expires December 31, 1968

3 Claims. (Cl. 117—70)

This invention relates to a floor consisting of a novel type of tiles which floor serves for stables for domesticated animals of all kinds. The invention relates further to a process for making the surface layer of the same.

It is an object of the invention to provide a stable floor that will keep dry and relatively warm even in cold and moist stables.

It is a further object of this invention to provide a stable floor of the aforesaid type which helps to avoid diseases among domesticated animals, such as cows, calves, hogs, lambs, sheep, and small animals as well as horses by preventing excessive exposure on a cold and moist stable floor.

It is a further object of this invention to provide a new type of tile from which the aforesaid stable floors can be made.

It is yet another object of the invention to provide a new process for making the surface layer of such tiles.

It is finally an object of the invention to provide a composite tile for constructing stable floors, the surface of which tiles is free from tar, benzene derivatives, residues of petrol, creosote, anthracene, phenol, crude cresol and similar products, said tiles thus being adapted for the construction of a warm, dry, and hygienically satisfactory floor in stables for domestic animals.

It is generally known and has been proved scientifically that a warm stable floor is of extreme importance for dairy and stock animals. Cold and moist stable floors for draft animals, cows, calves, hogs, lambs, sheep, and small animals are the main cause of most of their sicknesses and diseases, as well as their tendency to catch colds and of not feeling well. When resting, the animals are in contact with the moist, cold stable floor with at least one quarter of their bodies, whereby their most valuable organs requiring the most protection, especially the udders of cows, sheep and goats, are cooled off too severely. Especially milk-producing animals such as cows are very sensitive towards the influence of cold and moisture and incline to sicknesses of the udder, rheumatism, and colds of the breathing organs, which seriously affect their milk production. However, pregnant domestic animals such as horses, hogs and sheep suffer no less under the effects of improper stable floors, which is the reason why the losses, particularly of those born in the spring are very high. That young animals such as colts, calves, and goats require a warm, dry, and hygienically adequate stable floor does not have to be pointed out specially.

Various efforts have been made for many years to overcome these losses by warm, hygienic stables. Particularly the losses caused by war action and diseases have made it absolutely necessary to try to compensate for these losses so as to maintain the health of the remaining domestic animals, for the proper nutrition of the people, and to supply the fat industry. However, such efforts could, until now, only lead to partial success since a stable floor which really complied with all requirements did so far not exist. Thus a number of floors have been suggested which, however, all contain bituminous basic materials, which yield tiles having properties that correspond only in a very insufficient manner to the demand that must be made to the conditions of sufficiently warm stable floors even when various types of admixtures were added to the bituminous materials. Even floors consisting of tiles of two layers of the aforesaid kind of tiles did not fulfil the requirements stated above.

Patent No. 1,586,674 to Härtel describes a composite floor of this kind wherein the upper layer contains mineral and brown coal bitumen, cork, sawdust, and wood chips, and tar asphaltum, and benzol derivatives, residues of petrol, creosote and anthracene, phenol, crude cresol and the like chemical substances which are used as components in the upper layer not only as uniting and adhesive media but also as germicides.

According to the invention this object is fully realized as proved by extensive experience and years of testing by making the stable floor from tiles, with intermediate joints which are to be filled out before being used, which tiles are made of a composition comprising in a mixture, sawmill waste of certain kinds of wood, preferably the wood of conifers such as, for instance, firs, pines, pitch-pines and the like, chippings of rock materials, granular blast-furnace slag, or eruptive rock, such as pumice sand, and cement as a binding agent, mixed with such liquid additions which aside from water also contain chemical mineral ingredients of such effect as to insure the resistance of the sawmill waste to expansion and contraction, and to make it resistant to rot, while reducing the setting time of the binding agent. After attaining a certain degree of homogeneity of distribution of these ingredients in the mixture, and after the mass has been given a doughy consistency ready for molding, and been pressed into tiles and these are dried, they are then subjected to immersion in a coating fluid which places them in a condition ready to be laid, renders them waterproof, or water-repellent, and insensitive to any atmospheric or chemical influences, and gives them a protective coating which, although being highly elastic, odorless, as well as non-adhesive, still admits increased temperatures which may be up to 80 centrigrade degrees above the usual stable temperatures.

In detail, the basic materials of the mixture consist of the following:

(1) Coarse sawmill waste or scobs without any fine ingredient such as powder and dust, which sawmill waste, by chemical means, is made rot-resistant and given permanent roughness. Preferable materials are resinous pine wood wastes, for example, from fir, spruce, pine, pitch-pine, and the like.

(2) Chippings of different types of rock which are washed free of loam and other earth particles, which chippings are of a granular size from a few tenths of a millimeter up to a maximum of five millimeters, or similarly broken up blast-furnace slag or eruptive rock, such as lava, pumice stone, etc. After being screened these rock materials must still be useful, i. e. for the purpose of the invention they must be of rough surface and somewhat angular shape.

(3) Admixtures of chemical mineral substances which improve the resistance of the wood scobs against rotting and swelling, which substances generally act upon cellulose materials and affect hydraulic binding materials by reducing their setting time and, after setting, produce a hardening effect thereon. These qualities are, for instance, inherent in a commercial product which is known, for example, by the name "Uranit HB," and is described in the German Patent 847,724 and is manufactured by Hans Hauenschild, Chemische Fabrik K. G., Hamburg-Wandsbeck, Germany. Uranit HB is a mixture of a soluble alkaline earth metal salt, such as calcium chloride with a nitrite, such as for instance calcium nitrite, in an amount of about 20% of the total mixture.

(4) Standard cements, Portland cement, Portland iron cement and blast-furnace cement as binding agents. (Lime or limelike materials are unsuitable for making the tiles according to the invention.)

(5) Water free from lime.

A waterproofing or water-repellent, odorless coating of solidly black color which produces a glossy film and maximum elasticity, is devoid of disadvantages such as the tendency to adhesiveness caused by thermal influences, and the tendency to produce capillary fissures, to feather or accumulate into thickened portions and forming uneven film coatings, and which is also equally well resistant to atmospherical and chemical influences, is commercially known under the name Orkit/805/SP, manufactured by Hans Hauenschild, Chemische Fabrik KG, Hamburg-Wandsbek, Germany. Orkit/805/SP is a composition consisting of high vacuum bitumen and blown bitumen, with an addition of mineral spirits in a ratio by weight of about 4 to 6. The product has a viscosity of about 22° E. at 20° C., and a penetration of 10 to 15 at 25° C. The softening point of the Orkit composition is in the range of 90 to 100° C., according to ball and ring test. The content of paraffine in Orkit is below 2% and the ash content below 0.5% by weight. This product is even able to withstand temperature increases up to 80 centigrade degrees without changing its quality. It has proved very successful as a coating for the tile composition according to the invention.

A mixing ratio for the above-listed basic materials which experience has proved to be recommendable results if 30 parts by volume of sawmill waste substantially free from dust, and 30 parts by volume of gravel (quartz) or the above-mentioned granular stone chippings are mixed intimately in a dry state for about one hour in a concrete mixer with 20 parts by volume of cement. The mixing ratio of the liquid ingredients consists of 60 parts by volume of water and 10 parts by volume of the chemical mineral addition mentioned above under number 3.

The method which is being applied is as follows:

After mixing the sawmill waste, the gravel, and cement in a dry state, the mixture is mixed, for example, in the same mixer, with such a quantity of the liquid mixture that the contents will be placed in a condition like damp soil, and the mixture will be ready for use within a few minutes because of the increased binding action of the material added to the water and the cement. Thereafter, the mixture is placed in a mold and subjected to a pressure of 400 to 500 kg./cm.$^2$, preferably by hydraulic action. When using tile stamping machines, 2 to 3 strokes depending upon the weight of the ram bar should be sufficient, if granular destruction should be avoided.

In the following examples a few embodiments of the invention are illustrated.

*Example I*

25 parts by volume of tufaceous sand prepared by grinding tuff in a crusher to a particle size of up to 7 millimeter diameter, are introduced in a mixer and is mixed thoroughly with 10 parts by volume of pure quartz sand previously ground to a particle size of up to 3 mm. diameter.

10 parts by volume of coarse sawmill scobs from firwood are thoroughly moistened with "Uranit HB" solution containing ¼ liter "Uranit HB" in the ratio by volume of 1:6 in a separate mixer, so that each sawmill waste free from dust particle is well moistened. The coarse sawmill scobs are thus free from any tendency of swelling, resistant to rot, and non-inflammable. The scobs thus treated are then intermixed with the mixture of tufaceous sand and quartz sand in the mixer. 18 parts of Portland cement are then added thereto as a binder. The mixing operation is continued until all components are well coated with cement.

The composition thus obtained is then introduced into molds and molded to tiles at a pressure of about 200 atmospheres.

The tiles are then placed on asbestos layers and left to set for about 12 hours. The set plates are then stored and kept moist for at least 8 days. The binding process is complete after approximately 4 weeks.

As soon as the tiles are superficially dry they can be immersed in a bath of "Orkit" or another suitable water-repellant impregnant, which gives them an odorless protective coating in particular against corrosive liquids occurring in the stable or from the soil below the tiles.

*Example II*

A composition is prepared as in Example I, but omitting the admixture of quartz sand, thereby giving the stable floor to be formed from the tiles a warmer effect. The remaining treatment of the tiles is the same as in Example I. This composition according to Example II is used for manufacturing the bottom layer of the composite stable floor.

*Example III*

10 parts by volume of tufaceous material having a particle size of from 1 to 3 millimeters diameter are introduced in a mixer and 10 parts of pure, acid-resistant quartz sand of about the same particle size are added thereto. About 2 parts of sawmill scobs from pinewood which scobs were previously treated as described in Example I and dried, are added to the aforesaid mixture, and 22 parts of Portland cement are then added as a binder.

0.06 liters of black iron oxide (ferrous oxide) are also added to the mixture. The composition is then intimately mixed in the dry state, whereupon water containing 0.30 liters of "Uranit HB" in solution is added to the composition at a ratio of 1 part of the mixture to 6 parts of water in a separate mixer.

The resulting composition is used for making the upper surface layer of the tiles of the composite stable floor.

Preparation of the composite tile is carried out in molds by first filling the latter to one third their height with the mixture for the upper surface, and then filling the remaining two thirds with the warmer bottom layer composition described in Example II. Thereby a composite tile is obtained which is treated further in the same way as the uniform tile described in Example I.

The pressure applied in the mold in this case is 450 kg./cm.$^2$.

The invention will be yet more fully understood by reference to the following detailed description in connection with the accompanying drawings wherein.

Figure 1:
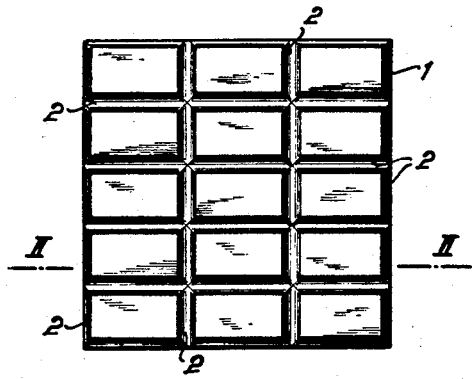
Figure 1 is a top view of a tile according to the invention.

Referring now to the drawings more in detail and in particular to Figure 1, reference numeral 1 indicates the tile which is preferably given square shape of a length along the edges of about 30 cm. and a thickness of 4 cm. Rectangularly intersecting grooves of substantially semicircular shape within the surface of the tiles 1 are indicated by the numeral 2, while the numeral 3 indicates mortar grooves of substantially rectangular shape provided in the lower surface of the tiles and only extending in the same direction and parallel to each other. After leaving the press, the molded products are placed on flat supports in shelves and are exposed to the air for drying for about three weeks. After setting completely, they are immersed in the coating bath and then dry completely in three times 24 hours. They are then ready for shipment and ready to be laid. Compression tests have shown that due to their extraordniary tensile strength they can withstand a weight of 145 kg./cm.² easily and without any disadvantages or damage.

Figure 2:
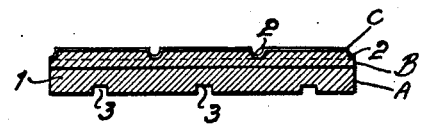
Figure 2 is a vertical section taken along line A—B in Figure 1.
Figure 3:
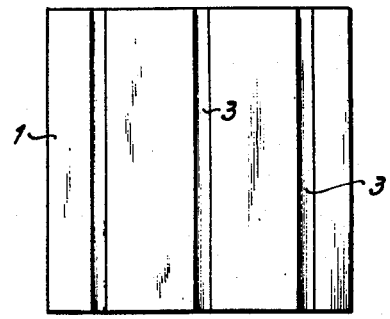
Figure 3 is a plan view of the bottom surface of the tile.

Figure 2 illustrates in cross section the composite tile consisting of a bottom layer (A), an upper layer (B), and a top coating (C).

What we claim is:

1. A composition for making tiles for animal stable floors, comprising an upper and a bottom layer, said upper layer comprising, in parts by volume, (a) from about 10 to 30 parts of sawmill waste from the wood of conifers, substantially free from dust; (b) from about 25 to 35 parts of granular chippings of at least one stone material selected from the group consisting of gravel, lava, tuff, eruptive rock, blast furnace slag, and quartz sand; (c) from about 18 to 20 parts of a cement selected from the group consisting of standard cements, Portland cement, Portland iron cement, and blast furnace cement; and (d) an admixture of an aqueous solution of at least one soluble alkaline earth metal salt in mixture with an alkaline earth metal nitrite in a ratio of 6 parts by volume of said solution for every part by volume of said sawmill waste, said salts being capable of making said sawmill waste resistant to rot and swelling by moisture, and abbreviating the binding time of said cement.

2. A composite tile for use in stable floors comprising an upper and a bottom layer, said upper layer comprising, in mixture, (a) from about 10 to 30 parts by volume of sawmill waste from the wood of conifers, substantially free from dust; (b) from about 25 to 35 parts by volume of granular chippings of at least one stone material selected from the group consisting of gravel, lava, tuff, eruptive rock, blast furnace slag, and quartz sand; (c) from about 18 to 20 parts of a cement, selected from the group consisting of Portland cement, Portland iron cement, and blast furnace cement; and (d) an aqueous solution of a mixture of a soluble alkaline earth metal nitrite with at least one other alkaline earth metal salt in a ratio of about 6 parts by volume of said solution for every part by volume of said sawmill waste, which mixture makes said sawmill waste resistant to rot and swelling by moisture; and as a coating at least on the top surface of said upper layer a water-repellent, acid-resistant black coating of a high vacuum bitumen in mixture with mineral spirits penetrated into the interior of the bitumen, which coating is highly elastic, odorless, non-adhesive and resistant to temperatures up to 80 centigrade degrees above normal stable temperatures.

3. A composite tile for use in stable floors consisting of a bottom layer comprising, in mixture, (a) from about 10 to 30 parts by volume of sawmill waste from the wood of conifers, substantially free from dust; (b) from about 25 to 35 parts by volume of granular chippings of at least one stone material selected from the group consisting of gravel, lava, tuff, eruptive rock, blast furnace slag, and quartz sand; (c) from about 18 to 20 parts of a cement, selected from the group consisting of Portland cement, Portland iron cement, and blast furnace cement; and (d) an aqueous solution of a mixture of a soluble alkaline earth metal nitrite with at least one other alkaline earth metal salt in a ratio of about 6 parts by volume of said solution for every part by volume of said sawmill waste, which mixture makes said sawmill waste resistant to rot and swelling by moisture; a top layer comprising, in mixture, in parts by volume (a) about 2 parts of sawmill waste from the wood of conifers, substantially free from dust; (b) about 10 parts of granular chippings of at least one stone material selected from the group consisting of gravel, lava, tuff, eruptive rock, and blast furnace slag; (c) about 10 parts of quartz sand; (d) about 22 parts of a cement selected from the group consisting of Portland cement, Portland iron cement, and blast furnace cement; (e) an admixture of an aqueous solution of at least one soluble alkaline earth metal salt in mixture with an alkaline earth metal nitrite in a ratio of 6 parts by volume of said solution for every part by volume of said sawmill waste, said salts being capable of making said sawmill waste resistant to rot and swelling by moisture, and abbreviating the binding time of said cement; and as a coating at least on the top surface of said bottom layer a water-repellent, acid-resistant black coating of a high vacuum bitumen in mixture with mineral spirits penetrated into the interior of the bitumen, which coating is highly elastic, odorless, non-adhesive and resistant to temperatures up to 80 centigrade degrees above normal stable temperatures.

References Cited in the file of this patent

UNITED STATES PATENTS

| | | |
|---|---|---|
| 898,381 | Mattison | Sept. 8, 1908 |
| 1,537,406 | Case et al. | May 12, 1925 |
| 1,586,674 | Hartel | June 1, 1926 |

FOREIGN PATENTS

| | | |
|---|---|---|
| 453,356 | Great Britain | Sept. 8, 1936 |